United States Patent
Trauernicht et al.

(10) Patent No.: US 6,247,801 B1
(45) Date of Patent: Jun. 19, 2001

(54) CONTINUOUS INK JET PRINTING PROCESS USING ASYMMETRIC HEATING DROP DEFLECTION

(75) Inventors: David P. Trauernicht, Rochester; Charles E. Romano, Jr., Pittsford; James M. Chwalek, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/451,790

(22) Filed: Dec. 1, 1999

(51) Int. Cl.[7] .................................. B41J 2/105; B41J 2/02
(52) U.S. Cl. ................................................. 347/74; 347/95
(58) Field of Search .................................. 347/75, 82, 95, 347/74; 106/20 R, 22 H, 23 H

(56) References Cited

U.S. PATENT DOCUMENTS

| | | | |
|---|---|---|---|
| 4,395,287 | * 7/1983 | Kobayashi et al. | 106/20 |
| 5,431,722 | * 7/1995 | Yamashita et al. | 106/20 R |
| 5,966,154 | * 10/1999 | Deboer | 347/82 |

* cited by examiner

Primary Examiner—Huan Tran
(74) Attorney, Agent, or Firm—Harold E. Cole

(57) ABSTRACT

An ink jet printing process comprising the steps of;
 a) providing an ink jet printer in which a continuous stream of ink jet ink is emitted from a nozzle that is responsive to digital data signals;
 b) loading the printer with an ink jet recording element;
 c) loading the printer with an ink jet ink comprising an organic solvent; and
 d) ejecting ink from a thermally-steered continuous ink jet print head onto one of the ink jet recording elements in response to the digital data signals.

12 Claims, No Drawings

CONTINUOUS INK JET PRINTING PROCESS USING ASYMMETRIC HEATING DROP DEFLECTION

FIELD OF THE INVENTION

This invention relates to an ink jet printing process that utilizes solvent inks in the method of asymmetric heating drop deflection.

BACKGROUND OF THE INVENTION

Ink jet printers are well known in the printing industry. Ink jet printers are just one of many different types of printing systems that have been developed which include laser electrophotographic printers; LED electrophotographic printers; dot matrix impact printers; thermal paper printers; film recorders; thermal wax printers; dye diffusion thermal transfer printers. Ink jet printing has become recognized as a prominent contender in the digitally controlled, electronic printing arena because, e.g., of its non-impact, low-noise characteristics, its use of plain paper and its avoidance of toner transfers and fixing. However, there is an ongoing demand for improved digitally controlled printing systems that are able to produce high color images at a high speed and low cost using standard paper.

One such improvement is disclosed in copending U.S. patent application Ser. No. 08/954,317 entitled "Continuous Ink Jet Printer With Asymmetric Heating Drop Deflection" by Chwalek, et al., filed Oct. 17, 1997, the disclosure of which is hereby incorporated by reference. That application teaches an apparatus for controlling ink in a continuous ink jet printer that includes an ink delivery channel; a source of pressurized ink communicating with the ink delivery channel; a nozzle bore which opens into the ink delivery channel to establish a continuous flow of ink in a stream, the nozzle bore defining a nozzle bore perimeter; and a droplet generator which causes the stream to break up into a plurality of droplets at a position spaced from the ink stream generator. The droplet generator includes a heater having a selectively-actuated section associated with only a portion of the nozzle bore perimeter, whereby actuation of the heater section produces an asymmetric application of heat to the stream to control the direction of the stream between a print direction and a non-print direction. However, there is no disclosure of any specific inks in this application and the only specific fluid used in the example is water.

Another feature of that patent application is a process for controlling ink in a continuous ink jet printer that includes establishing a continuous flow of ink in a stream which breaks up into a plurality of droplets at a position spaced from the ink stream generator; and asymmetrically applying heat to the stream before the position whereat the stream breaks up into droplets to thereby control the angle at which the ink deflects.

Along with the development of ink jet printing systems, such as the system employing asymmetric heating drop deflection, is the requirement of inks useful in ink jet printing. An ink composition must be capable of meeting very stringent criteria to be useful in ink jet printing. Such properties of major concern of the ink composition are viscosity, surface tension, pH, density, conductivity, adhesive characteristics, wetting characteristics, drying rate and shelf life.

It is an object of this invention to provide an ink jet printing process employing a particular ink useful in a thermally-steered, continuous ink jet print head which provides a greater difference in deflection angle at which the ink deflects.

SUMMARY OF THE INVENTION

This and other objects are achieved in accordance with the invention which comprises an ink jet printing process comprising the steps of;

a) providing an ink jet printer in which a continuous stream of ink jet ink is emitted from a nozzle that is responsive to digital data signals;

b) loading the printer with an ink jet recording element;

c) loading the printer with an ink jet comprising an organic solvent; and d) ejecting ink from a thermally-steered continuous ink jet print head onto one of the ink jet recording elements in response to the digital data signals.

By use of the process of the invention, ink jet prints are obtained using an ink in a thermally-steered, continuous ink jet print head which provides a greater difference in deflection angle at which the ink deflects.

DETAILED DESCRIPTION OF THE INVENTION

In a preferred embodiment of the invention, the ink has a viscosity of from about 0.5 to about 50 centipoise at 20° C., preferably from about 1 to about 6 centipoise at 20° C. In another preferred embodiment of the invention, the continuous stream of ink has a deflection angle greater than that of water.

As noted above, the ink used in the invention is an organic solvent. Organic solvents which may be used include a substituted or unsubstituted monohydric alcohol, ester or ketone solvent, such as methanol, ethanol, 1-propanol, 2-propanol, 1-pentanol, 3-pentanol, 4-hydroxy-4-methy-2-pentanone, ethyl acetate, cyclohexanone, 2-butanone or acetone. The solvent may also be a hydrocarbon or halogenated hydrocarbon solvent, such as an isoparaffin, hexane, toluene, methylene chloride or 1,1,1-trichloroethane. The solvent used may also be a mixture of water and a substituted or unsubstituted polyhydric alcohol or glycol ether such as ethylene glycol, diethylene glycol, tetraethylene glycol, diethylene glycol n-butyl ether, propylene glycol methyl ether, dipropylene glycol methyl ether, tripropylene glycol methyl ether, propylene glycol n-propyl ether, dipropylene glycol n-propyl ether, tripropylene n-propyl ether, ethylene glycol n-butyl ether, or diethylene glycol methyl ether. The solvent used may also be a mixture of water and a substituted or unsubstituted monohydric alcohol, ester, lactone, ketone, or cycloamide such as ethyl L-lactate, diacetone alcohol, 2-pyrolidinone, 1-methyl-2-pyrolidinone, hydroxyacetone, 2,2-dimethyl-1,3-dioxolane-4-methanol, butyrolactone or butoxyethanol. The solvent used may also be a sulfoxide, ether or hydroxyether.

When a mixture of an organic solvent and water is used, generally the organic solvent is present in an amount of from about 10 to about 90 percent of the mixture by volume.

As noted above, a continuous ink jet printer system that employs the method of asymmetric heating deflection is disclosed in the above-referred to U.S. Ser. No. 08/954,317. Following is a general description of the process employed. For specific details, please referred to the above-referred to U.S. Ser. No. 08/954,317. The system includes an image source such as a scanner or computer which provides raster image data, outline image data in the form of a page description language, or other forms of digital image data. This image data is converted to half-toned bitmap image data by an image-processing unit that also stores the image data in memory. A plurality of heater control circuits read data from the image memory and applies time-varying electrical pulses to a set of nozzle heaters that are part of a print head. These pulses are applied at an appropriate time, and to the appropriate nozzle, so that drops formed from a continuous ink jet stream will form spots on a recording medium in the appropriate position designated by the data in the image memory.

Recording medium is moved relative to a print head by a recording medium transport system, which is electronically controlled by a recording medium transport control system, and which in turn is controlled by a micro-controller. In the case of page width print heads, it is most convenient to move a recording medium past a stationary print head. However, in the case of scanning print systems, it is usually most convenient to move the print head along one axis (the sub-scanning direction) and the recording medium along an orthogonal axis (the main scanning direction) in a relative raster motion.

Ink is contained in an ink reservoir under pressure. In the non-printing state, continuous ink jet drop streams are unable to reach a recording medium due to an ink gutter that blocks the stream and which may allow a portion of the ink to be recycled by an ink recycling unit. The ink-recycling unit reconditions the ink and feeds it back to a reservoir. Such ink recycling units are well known in the art. The ink pressure suitable for optimal operation will depend on a number of factors, including geometry and thermal properties of the nozzles and thermal properties of the ink. A constant ink pressure can be achieved by applying pressure to the ink reservoir under the control of an ink pressure regulator.

The ink is distributed to the back surface of a printhead by an ink channel device. The ink preferably flows through slots and/or holes etched through a silicon substrate of the printhead to its front surface, where a plurality of nozzles and heaters are situated. With a printhead fabricated from silicon, it is possible to integrate heater control circuits with the printhead.

In the printing, an important system parameter is the angle at which the ink fluid deflects. This angle denoted by $\theta$ is the angle formed between a line connecting the deflected drops to the center of the nozzle bore on the surface of electrical insulating layers and a line normal to the electrical insulating layers centered at the nozzle bore. Greater drop deflection results in a more robust system. The larger the deflection angle $\theta$, the closer the ink gutter may be placed to the printhead and hence the printhead can be placed closer to the recording medium resulting in lower drop placement errors, which will result in higher image quality. Also, for a particular ink gutter to printhead distance, larger deflection angles $\theta$ result in larger deflected drop to ink gutter spacing which would allow a larger ink gutter to printhead alignment tolerance. Larger deflection angles $\theta$ also allow larger amounts of (unintended) undeflected drop misdirection. Undeflected drop misdirection may occur, for instance, due to fabrication non-uniformity from nozzle to nozzle or due to dirt, debris, deposits, or the like that may form in or around the nozzle bore.

The ink used in the invention usually contains a colorant such as a pigment or dye. Suitable dyes include acid dyes, direct dyes, solvent dyes or reactive dyes listed in the COLOR INDEX but is not limited thereto. Metallized and non-metallized azo dyes may also be used as disclosed in U.S. Pat. No. 5,482,545, the disclosure of which is incorporated herein by reference. Other dyes which may be used are found in EP 802246-A1 and JP 09/202043, the disclosures of which are incorporated herein by reference.

Any of the known organic pigments can be used to prepare ink jet inks used in the invention. Pigments can be selected from those disclosed, for example, in U.S. Pat. Nos. 5,026,427; 5,085,698; 5,141,556; 5,160,370 and 5,169,436, the disclosures of which are hereby incorporated by reference. The exact choice of pigment will depend upon the specific color reproduction and image stability requirements of the printer and application. For four-color printers, combinations of cyan, magenta, yellow and black (CMYK) pigments are used. An exemplary four color set is a cyan pigment, bis(phthalocyanylalumino)tetraphenyldisiloxane, quinacridone magenta (pigment red 122), pigment yellow 74 and carbon black (pigment black 7).

In addition to the organic solvent, a humectant may be employed in the ink jet compositions used in the invention to help prevent the ink from drying out or crusting in the orifices of the printhead. Examples of humectants which can be used include polyhydric alcohols, such as ethylene glycol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, poly(ethylene glycol) monobutyl ether (PEGMBE), and diethylene glycol monobutylether (DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone.

Penetrants may also be added to the inks employed in the invention to help the ink penetrate the receiving substrate, especially when the substrate is a highly sized paper. Examples of such penetrants include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Polymeric binders can also be added to the ink employed in the invention to improve the adhesion of the colorant to the support by forming a film that encapsulates the colorant upon drying. Examples of polymers that can be used include polyesters, polystyrene/acrylates, sulfonated polyesters, polyurethanes, polyimides and the like. The polymers may be present in amounts of from about 0.01 to about 15 percent by weight and more preferably from about 0.01 to about 5 percent by weight based on the total amount of components in the ink.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol 465® (available from Air Products Corp.) and Tergitol 15-S-5® (available from Union Carbide).

A biocide may be added to the ink composition employed in the invention to suppress the growth of micro-organisms such as molds, fungi, etc. in aqueous inks. A preferred biocide for the ink composition employed in the present invention is Proxel® GXL (Zeneca Specialties Co.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following components by weight: colorant (0.05–20%), water (0–90%), a humectant (5–70%), organic solvents (10–100%), penetrants (2–20%), surfactant (0.1–10%), biocide (0.05–5%) and pH control agents (0.1–10%).

Additional additives which may optionally be present in the ink jet ink compositions employed in the invention include thickeners, conductivity enhancing agents, anti-kogation agents, drying agents, waterfast agents, dye solubilizers, chelating agents, binders, light stabilizers, viscosifiers, buffering agents, anti-mold agents, anti-rusting agents, anti-curl agents, dispersants and defoamers.

Examples of buffering agents include, but are not limited to sodium borate, sodium hydrogen phosphate, sodium dihydrogen phosphate, mixtures thereof and the like.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

In traditional ink compositions for ink jet printer systems the solvents used function mainly to dissolve dyes and binders in the inks. It has been found that there is an improved operation in a continuous ink jet printer system employing the method of asymmetric heating drop deflection when using ink formulated from an organic solvent or a mixture of an organic solvent and water. This improvement consists of a sizeable increase in deflection angle when compared to water alone.

The following examples are provided to illustrate the invention

EXAMPLE 1

2-Propanol vs. Water

In the above-referred to U.S. Ser. No. 08/954,317, a print head with approximately 14.3 $\mu$m diameter nozzle was fabricated as with the heater surrounding one-half of the nozzle perimeter. An ink reservoir and pressure control was used to control the pressure of the ink stream. A fast strobe and a CCD camera were used to freeze the image of the drops in motion.

A heater power supply was used to provide a current pulse train to heater resulting in asymmetric heating of the fluid stream. The ink reservoir was first filled with water and a pressure of 135.0 kPa was applied forming a fluid stream. A series of 2.0 $\mu$s duration pulses at a repetition rate of 150 KHz was applied to the heater causing the stream to break into a series of regular drops and to cause the drops to deflect.

The resulting deflection angle was measured as a function of applied power. The deflection angle reaches approx. 1.9 degrees at an applied power of 60 mW for water.

The experiment was repeated this time filling ink reservoir with 2-propanol. The deflection angle at the same applied power is approximately 6.6 degrees almost 3.5 times the deflection angle of water.

For all applied powers, 2-propanol provides a larger deflection angle, while the relative comparison can vary depending on the applied power to the heater. For the subsequent examples, comparisons will be made for one applied power level to the heater.

EXAMPLE 2

2-Propanol and Water Mixtures

Mixtures of 2-propanol and water were prepared with various volume fractions. The resulting mixture was put into a pressurized bottle. The pressurized fluid passed through a filter, then to a printing head as previously described in this application with a 12 $\mu$m diameter orifice. The fluid exited the orifice with a velocity of approximately 10 meters/second. Pulses of electrical current were supplied to the heater structure around one half of the nozzle in a manner similar to Example 1.

The deflection angle $\theta$ of the stream of drops was measured using a strobe and camera system to image the stream as described in Example 1. The relative deflection of the various streams of the fluid mixtures is shown in Table I. Higher relative deflection values are more desirable and indicate good performance. The performance of the 100% 2-propanol fluid is assigned a value of 1.00.

TABLE I

| Water %/ 2-propanol % | Relative Deflection |
| --- | --- |
| 100/0 | 0.08 |
| 75/25 | 0.21 |
| 50/50 | 0.40 |
| 0/100 | 1.00 |

The above results show that mixtures of 2-propanol in water provide good relative deflection values.

EXAMPLE 3

2-Propanol, 1-Propanol, and 2-Butanone

The fluids 2-propanol, 1-propanol, and 2-butanone were tested in the same manner as described in example 2. The relative deflection of these fluids is shown in Table II. The performance of the 2-propanol fluid is assigned a value of 1.00.

TABLE II

| Fluid | Relative Deflection |
| --- | --- |
| 2-propanol | 1.00 |
| 1-propanol | 0.86 |
| 2-butanone | 0.66 |

The above results show that 1-propanol and 2-butanone both have good relative deflection values.

EXAMPLE 4

Alcohols

Various alcohols were tested in the same manner as described in example 2. The relative deflection of these fluids is shown in Table III. The performance of the 2-propanol fluid is assigned a value of 1.00.

TABLE III

| Fluid | Relative Deflection |
| --- | --- |
| Water | 0.11 |
| Methanol | 0.67 |
| Ethanol | 0.84 |
| 1-pentanol | 0.86 |
| 2-propanol | 1.00 |
| 3-pentanol | 1.18 |

The above results show that various alcohols have good relative deflections.

EXAMPLE 5

2-Propanol and 4-hydroxy-4-methyl-2-pentanone

The fluids 2-propanol and 4-hydroxy-4-methy-2-pentanone were tested in the same manner as described in example 2. The relative deflection of these fluids is shown in Table IV. The performance of the 2-propanol fluid is assigned a value of 1.00.

TABLE IV

| Fluid | Relative Deflection |
| --- | --- |
| 2-propanol | 1.00 |
| 4-hydroxy-4-methyl-2-pentanone | 0.60 |

The above results show that 4-hydroxy-4-methy-2-pentanone has a good relative deflection.

EXAMPLE 6

2-Propanol, 50% Ethylene Glycol/50% Water and 50% Diethylene Glycol/50% Water Mixtures of some of the chemicals known as glycols were prepared and tested in a similar manner as described in example 2 except the approximate fluid velocity was 8 meters/second instead of 10 meters/second. The relative deflection of these fluids is shown in Table V. The performance of the 2-propanol fluid is assigned a value of 1.00.

TABLE V

| Fluid | Relative Deflection |
| --- | --- |
| 2-propanol | 1.00 |
| 50% ethylene glycol/50% water | 0.53 |
| 50% diethylene glycol/50% water | 0.63 |

The above results show that mixtures of glycols in water have good relative deflections.

EXAMPLE 7

2-Propanol and Glycol Ethers

Glycol ethers, Dowanol®, were tested in a similar manner as described in example 2. The relative deflection of these fluids is shown in Table VI. The performance of the 2-propanol fluid is assigned a value of 1.00.

TABLE VI

| Fluid | Relative Deflection |
| --- | --- |
| 2-propanol | 1.00 |
| Propylene glycol methyl ether | 0.69 |
| Propylene glycol methyl ether acetate | 0.55 |
| Dipropylene glycol methyl ether | 0.71 |

The above results show that glycol ethers have good relative deflections.

EXAMPLE 8

2-Propanol and Hydrocarbons

Hydrocarbons were tested in a similar manner as described in example 2, except that the orifice size was 10 $\mu$m instead of 12 $\mu$m These fluids are isoparaffinic petroleum solvents sold under the trademark Isopar®. The relative deflection of these fluids is shown in Table VII. The performance of the 2-propanol fluid is assigned a value of 1.00.

TABLE VII

| Fluid | Relative Deflection |
| --- | --- |
| 2-propanol | 1.00 |
| Isopar E ® | 0.70 |
| Isopar L ® | 0.59 |
| Isopar M ® | 0.53 |
| hexane | 0.66 |
| 1,1,1-trichloroethane | 0.59 |
| cyclohexanone | 0.51 |
| toluene | 0.46 |

The above results show that hydrocarbons have good relative deflections.

EXAMPLE 9

2-propanol and Various Water Miscible Solvents and Water

The following mixtures were prepared and tested in a similar manner as described in example 2 except the approximate fluid velocity was approximately 10 meters/second. The relative deflection of these fluids is shown in Table VIII. The performance of the 2-propanol fluid is assigned a value of 1.00.

TABLE VIII

| Fluid | Relative Deflection |
| --- | --- |
| 2-propanol | 1.0 |
| 25% diacetone alcohol/75% water | 0.29 |
| 25% diethylene glycol n-butyl ether (Dowanol DB ®)/75% water | 0.30 |
| 50% 1-methyl-2-pyrrolidinone/ 50% water | 0.29 |
| 50% butyrolactone/50% water | 0.21 |
| 50% propylene glycol methyl | 0.39 |

TABLE VIII-continued

| Fluid | Relative Deflection |
|---|---|
| ether(Dowanol PM ®)/50% water | |
| 50% propylene glycol n-propyl ether(Dowanol PnP ®)/50% water | 0.41 |
| 50% propylene glycol methyl ether (Dowanol PM ®)/50% water | 0.39 |
| 50% ethyl L-lactate/50% water | 0.36 |
| 25% polyethylene glycol n-butyl ether/75% water | 0.23 |
| 50% hydroxyacetone/50% water | 0.18 |
| 50% butoxyethanol/50% water | 0.35 |
| 50% 2,2-dimethyl-1,3-dioxolane-4-methanol/50% water | 0.25 |
| 35% tripropylene glycol methyl ether (Dowanol TPM ®)/65% water | 0.34 |
| 40% dipropylene glycol methyl ether (Dowanol DPM ®)/60% water | 0.36 |
| 25% diethylene glycol methyl ether (Dowanol DM ®)/75% water | 0.16 |
| 15% dipropylene glycol n-propyl ether (Dowanol DPnP ®)/85% water | 0.23 |

The above results show that various organic solvent/water mixtures have good relative deflections.

EXAMPLE 10

Ink Jet Inks With and Without Dye

The following mixtures were prepared and tested in a similar manner as described in Example 2 except the approximate fluid velocity was approximately 10 meters/second. Keyfast Spirit Magenta RBS Dye® (0.5 wt. %) (Keystone Color Corp) was added to 4-hydroxy-4-methyl-2-pentanone and 1.0% of a magenta image dye, Example 1 of U.S. Pat. No. 5,144,015, was added to 2-propanol and the relative deflections were obtained before and after adding the dye. The ratio of the relative deflection with and without dye was calculated. The following results were obtained:

TABLE IX

| | Relative Deflection | | Ratio With: Without |
|---|---|---|---|
| Fluid | With Dye | Without Dye | Dye |
| 2-propanol | 1.10 | 1.00 | 1.10 |
| 4-hydroxy-4-methyl 2-pentanone | 0.58 | 0.60 | 0.97 |

The above results show that adding dye to the ink jet ink does not appreciably affect the relative deflection values.

EXAMPLE 11

Ink Jet Inks With and Without Dye

The following mixtures were prepared and tested in a similar manner as described in Example 2 except the approximate fluid velocity was approximately 10 meters/second. Duasyn Black KRL-SF Liquid® (25% of a 10% dye solution)(Clariant Corp.) was added to various mixtures of solvent and water as described in Table X below and the relative deflections were obtained before and after adding the dye. The ratio of the relative deflection with and without dye was calculated. The following results were obtained:

TABLE X

| | Relative Deflection | | Ratio With: |
|---|---|---|---|
| Fluid | With Dye | Without Dye | Without Dye |
| 25% 4-hydroxy-4-methyl-2-pentanone/75% water | 0.24 | 0.24 | 1.00 |
| 50% propylene glycol n-propyl ether (Dowanol PnP ®)/50% water | 0.49 | 0.43 | 1.15 |

The above results show that adding dye to the ink jet ink does not appreciably affect the relative deflection values.

The invention has been described in detail with particular reference to certain preferred embodiments thereof, but it will be understood that variations and modifications can be effected within the spirit and scope of the invention.

What is claimed is:

1. An ink jet printing process comprising the steps of;
    a) providing an ink jet printer in which a continuous stream of ink jet ink is emitted from a nozzle that is responsive to digital data signals;
    b) loading said printer with an ink jet recording element;
    c) loading said printer with an ink jet ink comprising an organic solvent; and
    d) ejecting ink from a thermally-steered continuous ink jet print head onto one of said ink jet recording elements in response to said digital data signals.

2. The process of claim 1 wherein an asymmetrical application of heat controls the direction of said ink jet ink between a print direction and a non-print direction.

3. The process of claim 1 wherein said ink jet ink has a viscosity of less than about 6 centipoise at 20° C.

4. The process of claim 1 wherein said continuous stream of ink jet ink has a deflection angle greater than that of water.

5. The process of claim 1 wherein said organic solvent is a substituted or unsubstituted monohydric alcohol, ester or ketone solvent.

6. The process of claim 5 wherein said organic solvent is methanol, ethanol, 1-propanol, 2-propanol, 1-pentanol, 3-pentanol, 4-hydroxy-4-methy-2-pentanone, ethyl acetate, cyclohexanone, 2-butanone or acetone.

7. The process of claim 1 in which said organic solvent is a hydrocarbon or halogenated hydrocarbon solvent.

8. The process of claim 7 in which said organic solvent is an isoparaffin, hexane, toluene, methylene chloride or 1,1,1-trichloroethane.

9. The process of claim 1 wherein said organic solvent is a substituted or unsubstituted polyhydric alcohol or glycol ether, said ink also containing water.

10. The process of claim 9 wherein said organic solvent is ethylene glycol, diethylene glycol, tetraethylene glycol, diethylene glycol n-butyl ether, propylene glycol methyl ether, dipropylene glycol methyl ether, tripropylene glycol methyl ether, propylene glycol n-propyl ether, dipropylene glycol n-propyl ether, tripropylene n-propyl ether, ethylene glycol n-butyl ether, or diethylene glycol methyl ether.

11. The process of claim 1 wherein said organic solvent is a substituted or unsubstituted monohydric alcohol, ester, lactone, ketone or cycloamide, said ink also containing water.

12. The process of claim 11 wherein said organic solvent is ethyl L-lactate, diacetone alcohol, 2-pyrolidinone, 1-methyl-2-pyrolidinone, hydroxyacetone, 2,2-dimethyl-1,3-dioxolane-4-methanol, butyrolactone, or butoxyethanol.

* * * * *